UNITED STATES PATENT OFFICE.

WILLIAM H. SPOONER, OF BRISTOL, RHODE ISLAND.

COMPOSITION OIL FOR LUBRICATING, PAINT, &c.

Specification forming part of Letters Patent No. 45,090, dated November 15, 1864.

*To all whom it may concern:*

Be it known that I, WILLIAM H. SPOONER, of Bristol, in the county of Bristol and State of Rhode Island, have invented certain new and useful Improvements in Composition Oils for Lubricating, Paint, and other Purposes; and I hereby declare that the following is a full, clear, and exact description of the same.

The object of this my invention is to produce a cheap substitute for the different oils or compositions of oils used in the arts for the purposes of lubricating, painting, softening wool, leather, &c. The large amount of mineral oil manufactured from coals, peat, tar, &c., or drawn from the oil-wells, and which can be afforded at comparatively small cost, suggested the employment of this substance as a substitute for animal or vegetable oil for the uses before mentioned, but it was found that it did not possess the requisite qualities.

Attempts were heretofore made to produce from coal-oil or paraffine lubricating or other dense oils used for various purposes in the arts. For this purpose caoutchouc or other gummy and resinous substances were combined with by dissolving them in coal-oil or paraffine; but the results do not appear to have given satisfaction, and no good lubricating, paint, or other like oil made from mineral oil or its distillates has, to my knowledge, been successfully introduced.

The experiments instituted by me have resulted in the production from mineral oils of an oil admirably adapted for lubricating machinery, oiling of wool, preparing paints, softening leather, and for many other purposes, and I have accomplished this by proceeding in the manner as follows: I first take caoutchouc or pure india-rubber, such as purchasable in the market, and dissolve it in paraffine-oil, benzine, or naphtha in the proportions of one pound of the former to four gallons of the latter. If paraffine-oil be used as the dissolving agent of caoutchouc, I would recommend that it should be warmed to about 100° Fahrenheit. The mixture of one pound of caoutchouc with four gallons of either of the above-named substances should be exposed to frequent agitation for about ten days, when the mixture will be complete and intimate. I then take paraffine-oil, such as derived from the distillation of coals, peat, tar, or petroleum, and add it to the mixture or solution before described in the proportions of forty gallons of the former to three of the latter, heating the mixture to a temperature of from 100° to 200° Fahrenheit, agitating the mass for five hours, more or less. The mixture is then allowed to rest, and a separation of impure and foreign matters and of undissolved caoutchouc will take place, when the clear oil, ready for use, may be drawn off.

Having thus fully described my invention and the manner in which the same is or may be carried into effect, I claim—

1. The method herein described of preparing oil adapted for use as a lubricating, paint, wool, currier's, or other like oil by combining with dissolved caoutchouc paraffine-oil, when said combination is effected in the proportions and in the manner herein set forth.

2. As a new article of manufacture, a composition oil, the same consisting of caoutchouc dissolved in hydrocarbon mixed with the oily distillates of coal, peat, tar, or petroleum in the manner and the proportions set forth.

In testimony whereof I have signed my name to this specification before two subscribing witnesses.

WILLIAM H. SPOONER.

Witnesses:
 M. BENNETT,
 JAS. E. FRENCH.